United States Patent [19]
Lee

[11] Patent Number: 5,256,288
[45] Date of Patent: Oct. 26, 1993

[54] FILTRATION MEDIUM INCLUDING SUBSTRATE-SUPPORTED POROUS MEMBRANE AND METHOD FOR THE MANUFACTURE THEREOF

[75] Inventor: Charles A. Lee, Knoxville, Tenn.
[73] Assignee: Cer-Wat, Inc., Knoxville, Tenn.
[21] Appl. No.: 937,365
[22] Filed: Aug. 28, 1992
[51] Int. Cl.⁵ ............... B01D 67/00; B01D 69/14
[52] U.S. Cl. ............ 210/321.61; 210/321.67; 210/321.84; 210/507; 264/45.1; 264/DIG. 48; 264/DIG. 62
[58] Field of Search ........... 204/258; 210/634, 321.6, 210/321.61, 321.72, 321.67, 321.75, 499, 321.84, 500.27, 500.33, 500.34, 500.35, 500.36, 500.38, 500.39, 500.37, 500.42, 506, 507; 264/41, 45.1, DIG. 48, DIG. 62

[56] References Cited
U.S. PATENT DOCUMENTS

| | | | |
|---|---|---|---|
| 3,528,227 | 9/1970 | Lee et al. | 55/524 |
| 4,142,950 | 3/1979 | Creamer et al. | 204/258 |
| 4,571,359 | 2/1986 | Dutt | 428/240 |
| 4,657,806 | 4/1987 | Dutt | 428/226 |

OTHER PUBLICATIONS

Morrison, R. E., "Felt Capillary Structure and Water Removal", *Pulp and Paper Magazine of Canada*, Feb. 7, 1969, pp. 58–62.

*Primary Examiner*—Frank Sever
*Attorney, Agent, or Firm*—Luedeka, Hodges, Neely & Graham

[57] ABSTRACT

A filtration medium especially useful in cross-flow type filtration systems comprising a length of porous strong substrate, preferably woven, and a thin porous membrane, such membrane being bonded to the strands of the substrate by islands of resin uniformly spaced apart and disposed generally between the substrate and the membrane. The islands of resin enhance the integrity of the composite during its use in a filtration system. A method and apparatus for the manufacture of the filtration medium is disclosed.

9 Claims, 2 Drawing Sheets

FILTRATION MEDIUM INCLUDING SUBSTRATE-SUPPORTED POROUS MEMBRANE AND METHOD FOR THE MANUFACTURE THEREOF

This invention relates to filtration media and particularly to filtration media that are useful in cross-flow type filtration systems.

Cross-flow filtration systems require that the liquid-solid mixture ("slurry") be flowed over the surface of a filtration medium at a rate at which the solids of the slurry are swept along with the flowing slurry and not allowed to contact the surface of the filtration medium for a time period sufficient to permit their accumulation on the medium. These systems require that the slurry be pressurized (hence contained in a closed system) to the extent that the required flow (i.e., velocity) of the slurry can be maintained and that the liquid can be forced to preferentially flow from the slurry and out of the closed system to thereby reduce the liquid content of the slurry. In these systems, there is never any accumulation of the solids in the form of a filter cake as is commonly thought of in filtration systems. But rather, these systems serve only to concentrate the solids within the slurry. The limit of liquid removal, hence the solids content of the slurry, is in large part dictated by the ability of the system to pump the slurry as it thickens due to increasing solids concentration as the slurry is recycled through the system. Maximum solids concentrations of about 25% are common—solids concentrations of the slurry of greater than about 50% are rare, if at all obtainable, due to the availability of acceptable filtration media which can withstand the high pressures required in pumping of the concentrated slurry for maintaining the necessary flow velocity of the slurry.

Tubular filtration media have been recommended for use in cross-flow filtration systems. These media include an inner porous liner which has tortuous passageways through its thickness. This liner is backed by a spongy porous middle layer and an outer non-porous strength layer. Fine solid particles which pass through the inner layer can become captured in the spongy middle layer from which they normally cannot be removed so that these media tend to have short service lives. Further, the innermost surface of the liner of these tend to collect solid particles from the liquid/solid slurry being processed. These particles clog the pores of the liner so that steps must be taken to routinely and periodically perform a cleaning operation on the inner liner surface.

It is an object of the present invention to provide a composite filtration medium.

It is another object of the present invention to provide a composite filtration medium which is of the endless belt type.

It is another object of the present invention to provide a composite filtration medium which is useful in cross-flow filtration systems.

It is another object to provide a composite filtration medium from which solids collected thereon are readily removed.

It is another object to provide a method for the manufacture of a composite filtration medium.

It is another object to provide an apparatus for the manufacture of a novel filtration medium.

Other objects and advantages of the present invention will be recognized from the following description and claims, including the drawings in which:

Figure 1:
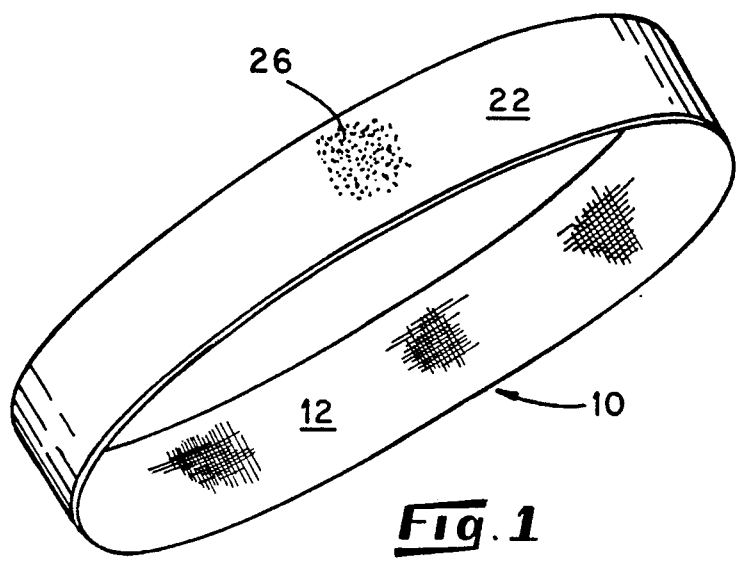
FIG. 1 is a schematic representation of a composite filtration medium embodying various of the features of the present invention.

In accordance with the present invention, there is provided a novel filtration medium which is particularly useful in cross-flow type filtration systems, and which comprises a strong, supportive, porous substrate, preferably woven from a plurality of strands which define knuckles at least on one of the surfaces of the substrate at the crossovers of the woven strands, these knuckles collectively defining a generally flat surface of the substrate. To the knuckles of this surface there is bonded a thin, porous membrane which defines through its thickness a plurality of substantially uniformly sized, and preferentially straight bore, passageways spaced over the area of membrane, the membrane being bonded to the substrate, by a plurality of islands of resin that are substantially uniformly spaced over the area between the substrate and the membrane, such islands being preferentially located at the intersections of the strands of the substrate and being of a size and location which does not deleteriously block the permeability of either the membrane nor the substrate.

In a preferred method for the manufacture of the present improved filtration medium, there is provided a woven substrate comprising strands selected to withstand the wear and tear associated with a filtration operation and to suitably define between the woven strands interstices which serve as passageways through which liquid can pass in the course of the filtration operation. Selected particulates of a thermoplastic resin are overlaid in a uniform layer onto the substrate. The size of the individual resin particulates is chosen such that these particulates do not readily, and preferably none at all, will pass through the interstices between the strands of the substrate. These resin particulates also are larger in size than the diametral dimension of the pores of the porous membrane so that they will not enter and block these pores. Additionally, the size of the resin particulates is not to be greater than required to effect spaced apart islander bonding locations between the strands of the substrate and the porous membrane. After the layer of resin particulates is applied to one of the flat surfaces of the substrate, a web comprising the porous membrane is overlaid onto the layer of particulates, and preferably lightly pressed into intimate engagement with such layer. A second woven web, which preferably is substantially like the woven substrate, is overlaid on the membrane in covering relationship thereto. The combination of substrate, resin, membrane and overlying web is thereafter heated by means of heat applied only from that side of the substrate which is free of the particulate layer, whereupon the resin particulates are caused to be heated to at least their glass transition temperature, $T_g$, and, whereupon the resin particulates melt and flow preferentially to the intersections of the strands of the substrate to develop islands of resin disposed between the substrate and the overlying porous membrane. Upon cooling below their glass transition temperature, the islands of resin solidify and, at their spaced apart locations, bond to the strands of the substrate, and bond to the inwardly-facing surface of the porous membrane to secure the membrane to the substrate and thereby develop an integrated composite. Most unexpectedly, the heated resin was found to not adversely block the permeability of either the porous membrane or of the substrate. But rather, through the selection of the manufacturing parameters, e.g. temperature and duration of heating, and the choice of particulates, both as to size and other physical characteristics such as their response to heating, among other things, it was found that the particulate layer could be made to function as an excellent bond between the membrane and the substrate while simultaneously not adversely affecting the permeability of the composite filtration medium.

With reference to the several Figures, in a preferred embodiment, the filtration medium 10 of the present invention comprises a substrate 12 woven from a plurality of warp yarns 14 and weft yarns 16 which define therebetween a plurality of interstices 17. The weave pattern depicted in the Figures is of the square type, but it is anticipated that any of several weave patterns may be employed in the formation of the substrate, such as for example, the complex weave patterns that are commonly employed in the manufacture of forming fabrics for papermaking machines and the like. In any event, the substrate must be of a construction and of materials which will provide the required physical support properties for the filtration medium as are necessary for a particular use of the medium and which defines open passageways through its thickness which can serve as the basis upon which modifications may be imposed by means of the application thereon of one or more layers of disparate materials. In particular, the material of the substrate must have a glass transition temperature that is greater than that of the resin particulates. In one acceptable embodiment, the individual yarns 14 and 16 are of a polyester. The respective diametral dimensions of the warp and weft yarns may vary widely, depending upon the intended end use of the medium, and yarn diameters between about 0.005 inch and about 0.020 inch have been found acceptable. As noted above, complex weave patterns may be employed. In this latter instance, it is common to employ yarns of different diameters for the warp and weft yarns. Other acceptable weave patterns and materials of construction for suitable substrates those forming fabrics well known in the papermaking industry such as complex weaves embodying fine mesh and coarse mesh "layers". These weaves may have, for example, 54×88 (CD×MD) mesh, or 77×77 mesh combined with a layer of 39×38 mesh and similar weaves.

The woven substrate functions principally as a support for the porous membrane which is the primary "active" filtration component of the composite. Accordingly, the substrate may be made strong by choosing from any of a large number of weave patterns, by choosing relatively large strands for use in weaving the substrate, and by choosing strands of any material which is compatible with the mixture being separated and the operating parameters of the filtration process such as pressure, temperature and chemical composition of the mixture being separated. This provides a large measure of choices in the construction of the substrate and permits these choices to be in large part selected on the basis of economics. In the choice of material(s) of construction of the substrate, it is of importance that consideration be given to the ability of the chosen thermoplastic resin particulates of the added layer to be bondable to the substrate by the application of heat inasmuch as it is through this means that the thermoplastic resin particulates are secured to the substrate and effect a bond between the porous membrane and the substrate.

In the present composite filtration medium, the substrate 10 is composited with an overlying porous membrane 22. Suitable membranes include those which possess resistance to attack by the anticipated materials to be separated and which provide passageways (pores) 26 through the thickness thereof that will permit the preferential passage of liquid therethrough to the exclusion of a second component, usually a solid, of the materials being separated. Uniformity of pore size, "straight through" passageways (pores) as opposed to tortuous passageways, and low cost are also desirable characteristics of the selected porous membrane. One suitable porous membrane is a polycarbonate membrane such as that sold by Poretics Corporation of Livermore, Calif., under the trade name PCTE membranes and identified as Poretics' Polycarbonate Track-Etch membrane filters. This membrane is available with any of a relatively large variety of overall porosities, and including individual pore sizes ranging from pores having an average diameter of about 0.01 micrometers to about 14 micrometers, thicknesses of between about 6 and about 10 micrometers, pore densities of between about $6 \times 10^8$ to about $1 \times 10^5$ pores/cm$^2$, and water flow rates of between <0.1 to about 4,000 ml/min/cm$^2$. A preferred membrane is of a thickness of about 10 micrometers. Each of these membranes has a glass transition temperature or melting point that is sufficiently high as to permit use of the membrane in the manufacture of the present filtration medium when employing the resin particulates described herein. The glass transition temperature or melting point of the membrane is to be higher than the glass transition temperature of the resin particulates, it being recognized that the membrane is subjected to the heat employed in the fusing of the resin particles to bond the membrane to the substrate.

Inasmuch as the membrane of the present composite filtration medium is fully supported by the strong substrate, the membrane may be, and preferentially is, very thin, being typically about 10 microns thickness. This membrane obviously is very flimsy and generally incapable of withstanding pressures which may be encountered in a filtration system. Contrary to expectations that this flimsy membrane would be deformed into the interstices of a woven substrate when overlaid onto such substrate and subjected to the pressures of crossflow filtration, it has also been found by the present inventor that this flimsy membrane may be maintained in a substantially flat plane through the use of the resin island bonding system of the present invention. It is believed that this novel bonding system reduces the span of the membrane between bonding locations so that the membrane remains taut and flat on the surface of the substrate, thereby maintaining the pores of the membrane open and enabling it to withstand the pressures encountered.

As referred to hereinabove, a plurality of thermoplastic resin particulates 18 are interposed between the substrate 12 and the porous membrane 22. As shown in the depicted embodiment, the resin particulates are substantially of uniform size and are spaced substantially uniformly apart from one another to define substantially uniformly spaced bonding islands between the porous membrane and the substrate. Suitable thermoplastic resins particulates may be of polyester, polyamide, polyvinyl alcohol, acrylic, polypropylene, polyurethane, polyvinyl acetate or polyethylene. In any event, the resin must be available in particulate form and preferably of substantially uniform particle size. The preferred particle size distribution for the resin particulates is relatively narrow, but in any event is greater than the mesh of the substrate. The specific particulate size of the individual particulates of the resin are in primary part dictated by the choice of substrate, in that the resin particulates are to be of a size that will not readily, if at all, pass through the interstices between the strands of the substrate. By way of example, a substrate having interstices which have diameter of about 0.03 inch will dictate resin particulates have a diameter of greater than about 0.03 inch. In this manner, the resin will not pass through the interstices of the substrate during the steps of manufacturing the present filtration medium. Preferably, the size of the resin particulates is chosen to be at or near the minimum size of resin particulate which will not pass through the substrate interstices so as to minimize the quantity of resin at any given islander bond and thereby minimize potentially blocking of the pores of the membrane or the substrate when the resin is fused during the bonding operation. The preferred thermoplastic resin employed in the present invention exhibits a glass transition temperature below about 150° C. As noted hereinabove, it is of importance that the glass transition temperature of the resin particulates, and of the material of construction of the substrate be considered together. In any event, the glass transition temperature of the resin particulates must be less than the glass transition temperature (or melting point or vaporization temperature) of the substrate and the porous membrane. Between about 0.05 and about 0.10 grams of the resin particulates are applied per square inch of substrate surface area. Suitable resin particulates are available from EMS-American Grilon, Inc. of Sumter, S.C., under the product name of Griltex 9/1332P2-5.

For use in a cross-flow filtration system, the present composite filtration medium 12 includes a porous membrane 22 which has an average pore size that is smaller than the smallest particle expected in the liquid/solid slurry being separated. By this means, essentially no fine (i.e. small) solid particles will enter the pores 26 of the membrane. If any small particle does enter a pore, because of the straight-bore of the pore, the particle passes fully through the pore. In accordance with one aspect of the present invention, the filtration medium product includes relatively large open passageways through the thickness of the substrate (i.e. between the opposite surfaces of the substrate) which are of a size which provide for the substantially unimpeded flow therethrough of the liquid medium of the mixture and any solid particles which may negotiate passage through the pores of the membrane. It is believed that the present filter, because of its combination of relatively larger open passageways through the thickness of the substrate also provides for the removal of gross quantities of liquid (i.e. rapid carrying away of liquid) from the downstream surface of the porous membrane thereby enhancing the separative action of the porous membrane. That is, it appears that the ready removal of the liquid from the downstream surface of the porous membrane through the relatively larger passageways defined by the substrate enhances the rate of withdrawal of liquid from the mixture being separated by not impeding the flow of liquid through the pores of the membrane. This effect has been realized while simultaneously essentially eliminating plugging of the pores in the porous membrane.

By changing the conditions of flow of the liquid/solids slurry over the surface of the present filtration medium, and/or the differential pressure across the medium, a filter cake forms on the outermost surface of the porous medium. Because no solid particle can pass through the small pores of the membrane, and if the solids are not swept past the pores, they initially bridge the pores. In time, further solids collect to form the filter cake.

In accordance with a further aspect of the present invention, it is noted that contrary to the mechanism of filtration exhibited by conventional screen type filter media wherein capture of one of the components of the mixture being separated is effected by capture of such component in the tortuous passageways of the filtration medium, in the present invention, the combination of a woven substrate, and porous membrane as taught by the present inventor produces capture of the solid component on the outermost surface of the porous membrane, not within the pores of the membrane. This mechanism reduces the tendency of the membrane to clog due to the capture of material that lodges in the open passageways through the thickness of the membrane, and because any solids which might pass through the membrane are materially smaller than the "pores" through the substrate, there is no capture of these solids by the substrate, hence there is no plugging of the substrate. By this means, the filtration medium of the present invention permits the rapid buildup of a filter cake (representing efficient filtration), and for enhanced ease of removal of the filter cake from the filtration medium.

Figure 2:
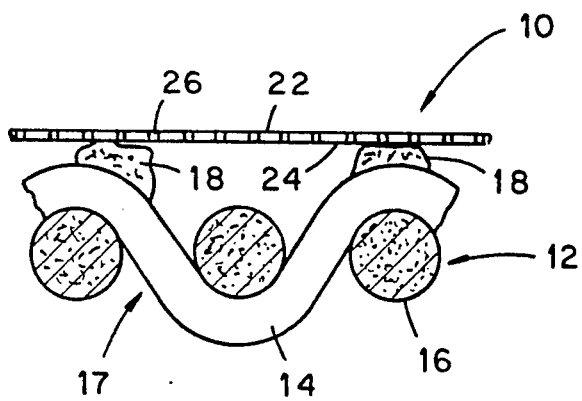
FIG. 2 is an enlarged schematic representation, in cross-section of an unbonded lay-up of various components of a filtration medium and depicting various features of the invention.
Figure 3:
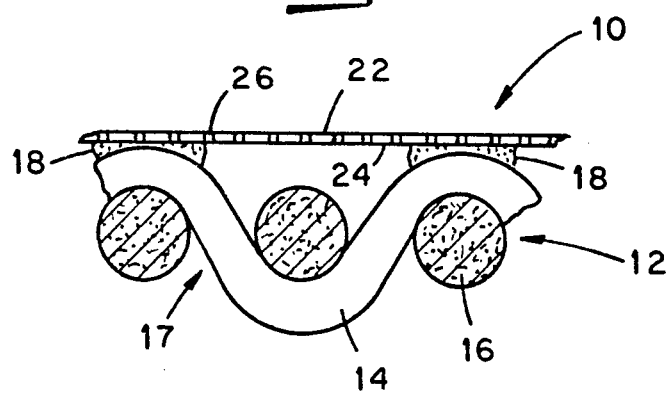
FIG. 3 is an enlarged schematic representation, in cross-section, as in FIG. 2, but depicting the components in bonded relationship.

Again referring to Figures, and particularly FIG. 2, in the course of fabrication of the depicted filtration medium 10, the substrate 12 is overlaid with a porous membrane 22 with resin particulates 18 disposed between the substrate and the porous membrane. Notably, the resin particulates are disposed at spaced apart locations, these locations being distanced from one another as precludes interparticulate bonding. Thus, the limited presence of the resin does not adversely affect the porosity of either the membrane or the substrate. Also of importance, the points or locations of contact between resin particulates and the inner surface 24 of the porous membrane are selectively limited by reason of the number and location of the individual resin particulates and by the discovery that when heated, the resin migrates to the intersections of the strands of the woven substrate thereby developing membrane to substrate bonding at the knuckles of the strands of the substrate. In this manner, the bonding of the membrane to the substrate is limited and there is minimal blocking by the resin particulates of the pores 26 that extend through the thickness of the membrane or the interstices 17 between the strands 14 and 16 of the substrate. Certain of the components of FIGS. 2 and 3 are exaggerated to better depict the invention.

Figure 4:
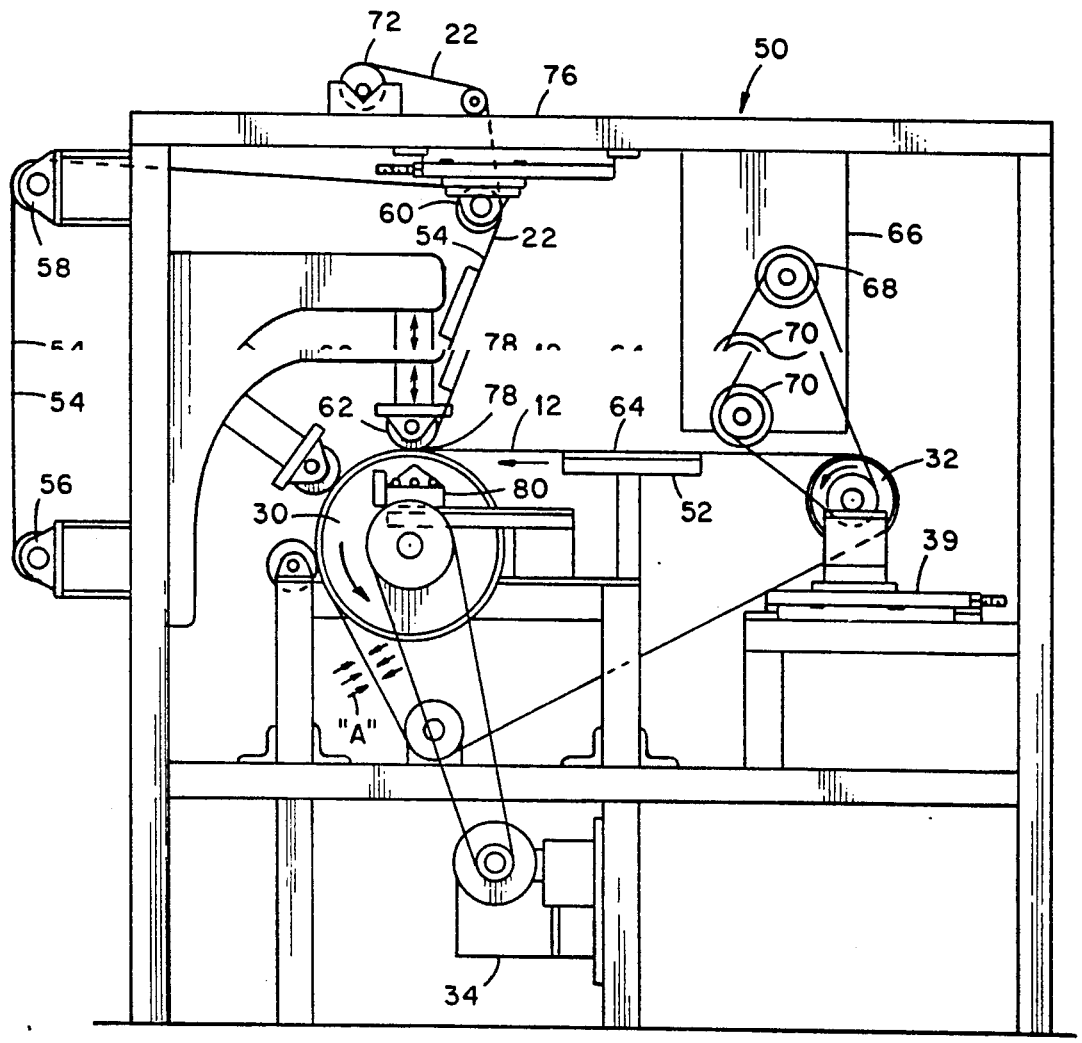
FIG. 4 is a side elevational view, partly diagrammatic, of an apparatus for use in the manufacture of a composite filtration medium in accordance with the present invention.

One embodiment of an apparatus for use in the manufacture of the novel filtration medium of the present invention is depicted in FIG. 4. With reference to FIG. 4, an endless woven substrate 12 is trained about a set of rolls 30, 32, and 33, roll 33 being driven as by a motor 34 and drivingly coupled to the roll 30 as by a drive belt 36. Rolls 32 and 33 are idler rolls. As desired, roll 32 is mounted on a slide 39 which serves as an adjustment for the tension of the endless substrate 12 on the rolls. The rolls, motor and other components of the apparatus are mounted within a frame, indicated generally by the numeral 50. A support plate 52 is mounted within the frame and beneath the upper run 38 of the substrate 12 to provide support to the substrate as it moves along such upper run. A further endless belt 54 which preferably is identical to the substrate 12, is trained about a set of rolls 56, 58, 60 and 62 and is driven by frictional contact between this belt 54 and the driven roll 30. The roll 62 is adjustably mounted above and contiguous to the outer and upper surface of the roll 30 so as to be in position to apply pressure to the substrate 12, and other components as will be discussed, as these components move into engagement with the outer surface of the roll 30, thereby urging such components into a composite.

As the substrate 12 moves forwardly from the idler roll 32, there is deposited on its upper surface 64 a quantity of thermoplastic resin particulates from a hopper 66. Within the hopper, the particulates are first dispensed by a grooved roll 68. The grooves (not shown) in this roll 68 extend along the length of, and on the outer circumference of the roll 68 and serve to receive therein portions of the resin particulates. As the roll rotates, the individual portions of particulates are dumped onto a screen 69 which is contacted by a rotating brush roll 70 to aid in dispensing the particulates uniformly onto the upper surface of the substrate.

The substrate, carrying the particulates thereon, is overlaid by a porous membrane 22 which is dispensed from a supply roll 72 mounted conveniently to the frame, such as on the top frame member 76. Preferably, the membrane is caused to contact the layer of particulates on the substrate at the nip 78 between the pressure roll 62 and the driven roll 30 and is captured between the endless belt 54 and the resin-bearing substrate 12 whereupon the membrane is at least lightly pressed into intimate contact with the layered substrate. This combination is trained about the circumference of the roll 30.

As shown in FIG. 4, the roll 30 is hollow and contains therein a heater 80 which serves to heat the circumferential shell of the roll. This heat is the source for heating the resin particulates to at least their glass transition temperature, such heating taking place while the composite comprising the substrate, the resin particulates and the porous membrane are captured and held in intimate contact with the outer circumferential surface of the heated roll 30. In this manner, among other things, the degree of heating of the composite is controllable by the amount of heat applied, the speed of rotation of the roll 30 and the degree of wrap of the composite about the circumference of the roll 30. Upon completion of the desired heating, the composite is cooled to a temperature below the glass transition temperature of the resin particulates as by means of air jets (arrows "A") directed against the formed composite as it moves forward and leaves the roll 30.

In a preferred operation, the formation of the composite filtration medium is formed during one complete pass of the substrate through the apparatus. The depicted apparatus can be used to form an endless filtration medium of a specified size, or the formed composite may be removed and cut to a desired length and then rejoined at its ends to provide a different size (length) medium.

Employing the concepts of the present invention, the inventor has made filtration media from a variety of materials, each of which exhibits its own pore size, overall porosity, filtration capabilities, and related physical properties. By way of example, filtration media have been formed using substrates comprising complex woven fabrics such as that available from Huyck Corporation under the tradename Formex 324GX. This fabric includes cross-direction (CD) yarns having a diameter of 0.0197 inch. Two such yarns are essentially stacked atop the other, and separated at intervals by machine direction (MD) yarns each of 0.0122 inch diameter. In the CD there also is provided a number of 0.0091 inch diameter yarns which extend in the CD and MD to serve, among other things, to interlock the fine and coarse mesh layers. In this fabric there are 54 openings per linear inch in the CD and 88 openings per linear inch in the MD. Approximately 0.075 grams of resin particulates per square inch were spread uniformly onto the substrate. The resin particulates were polyester of 200 to 500 micron (coarse) particle size available from Emser Industries of Sumter, S.C., and exhibited a glass transition temperature of 150° C. A porous membrane having uniformly distributed pores through the thickness thereof was overlaid on the layered substrate. This membrane was obtained from Poretics Corporation, was 6 micrometers thick, and had a pore size of 14 micrometers. This particular membrane is fabricated from polycarbonate, is autoclavable, and bonded well to the substrate employing the polyester resin particulates when the composite was heated to a temperature of about 150° C. in the manufacturing apparatus depicted in FIG. 4, while entrained about the heated roll 30 traveling at a circumferential speed of 1.5 ft/min and with the composite in contact with the roll 30 over a distance of about 12 inches. Examination of the formed filtration medium revealed that the porous membrane was securely bonded to the substrate at spaced apart locations that were uniformly spread over the area of the composite. No deleterious effect upon the overall porosity (permeability) of the membrane was noted, but rather the filtration medium exhibited uniform permeability over its entire surface area.

I claim:

1. A filtration medium comprising a porous substantially planar substrate means having first and second substantially planar opposite surfaces defined by the cumulative effect of spaced apart portions and which provides support to the medium and further defines a plurality of open passageways between said opposite surfaces to define the gross filtration capacity of the medium, a thin porous membrane overlaid on one of said surfaces of said substrate, the pores of which define open passageways through the thickness of said membrane of a size sufficient to permit the passage therethrough of a liquid which is under the influence of a pressure differential across the thickness of said medium, and a plurality of discrete and substantially uniformly spaced-apart islands of thermoplastic resin of substantially uniform size disposed between said one of said surfaces of said substrate and said membrane and maintaining said substrate and said membrane in spaced apart relationship, said resin being bonded at fixed spaced apart locations to said substrate and to said porous membrane to integrate said substrate and said membrane in their spaced apart relationship.

2. The filtration medium of claim 1 wherein said thermoplastic is chosen from the class consisting of polyamide acrylic, polyethylene, polypropylene, polyvinyl acetate, polyvinyl alcohol, polyurethane and polyester.

3. The filtration medium of claim 1 wherein said substrate is woven from warp and weft strands and said resin is disposed at the intersections of said warp and weft strands.

4. The filtration medium of claim 1 wherein said porous membrane includes substantially straight-bore pores through the thickness thereof.

5. The filtration medium of claim 1 wherein each of said islands of resin is formed from a single resin particulate.

6. The filtration medium of claim 5 wherein each of said single resin particulates is between about 200 and about 500 micrometers in diameter.

7. The filtration medium of claim 1 wherein the particle diameter of each of said resin particulates is greater than the diametral dimension of the interstice between adjacent strands of said substrate, but sufficiently small as to not deleteriously affect the permeability of either said membrane or said substrate upon the heating of said resin particulates to their glass transition temperature and subsequently cooling said resin to solidify the same.

8. A method for the formation of a filtration medium capable of providing at least one generally planar filtration surface comprising the steps of selecting a strong planar substrate having first and second substantially planar opposite surfaces and having defined through the thickness thereof a plurality of open substantially straight bore passageways which extend between said opposite surfaces;

depositing a quantity of discrete thermoplastic resin particulates onto one of said surfaces of said substrate, said particulates being of a size not less than about the mesh size of said substrate;

thereafter overlaying a thin porous membrane onto said resin particulate-bearing surface of said substrate, said membrane defining through the thickness thereof a plurality of open pores each of which is of a size which permits the flow of a liquid therethrough under the influence of a differential pressure across said medium;

thereafter heating said substrate-resin-membrane composite to at least the glass transition temperature of said resin whereupon said resin becomes sufficiently fluid to flow;

thereafter cooling said substrate-resin-membrane composite to a temperature below the glass transition temperature of said resin whereupon said resin particulates become bonded at fixed spaced-apart locations to said substrate and to said membrane and remain disposed between said substrate and said membrane to thereby maintain said substrate and said membrane in spaced-apart relationship.

9. The method of claim 8 wherein said composite is heated by means of heat applied to that surface of said substrate opposite the surface which carries said resin and membrane.

* * * * *